United States Patent [19]

Vaseen

[11] 4,263,263

[45] Apr. 21, 1981

[54] INTERNAL COMBUSTION ENGINE-EXHAUST GASES AND PARTICULATE TREATMENT

[76] Inventor: Vesper A. Vaseen, 9840 W. 35th Ave., Wheatridge, Colo. 80033

[21] Appl. No.: 44,964

[22] Filed: Jun. 4, 1979

[51] Int. Cl.³ .............................................. B01D 53/34
[52] U.S. Cl. ....................................... 423/212; 60/295
[58] Field of Search ....................... 423/212, 245, 246; 60/295, 310; 210/63 R

[56] References Cited

U.S. PATENT DOCUMENTS

| | | | |
|---|---|---|---|
| 2,932,364 | 4/1960 | Binter | 423/212 |
| 3,556,734 | 1/1971 | Peterson | 60/310 X |
| 3,584,994 | 6/1971 | Herbsman | 423/212 |

FOREIGN PATENT DOCUMENTS 2250471  4/1973  Fed. Rep. of Germany ........... 423/235

Primary Examiner—G. O. Peters

[57] ABSTRACT

Hot discharged products of combustion from internal combustion particularly diesel engines containing oxidizable hydrocarbons, carbon monoxide, and particulate carbon are commingled with an inert halogenated hydrocarbon liquid, having eight or more carbon atoms in its make up; absorbing and entrapping these contaminants therein. The inert absorber liquid, pregnant with the contaminants, is then pressurized, which along with the temperature rise of the absorber liquid created from exchange of heat from the products of combustion gases, along with dissolved excess oxygen available from the excess air used during combustion: Wet oxidizes in a very short time the hydrocarbons, carbon monoxide, and particulate carbon to non objectionable carbon dioxide and water vapor; which are then disposed of to atmosphere. This invention is the process wherein these functions take place.

1 Claim, 1 Drawing Figure

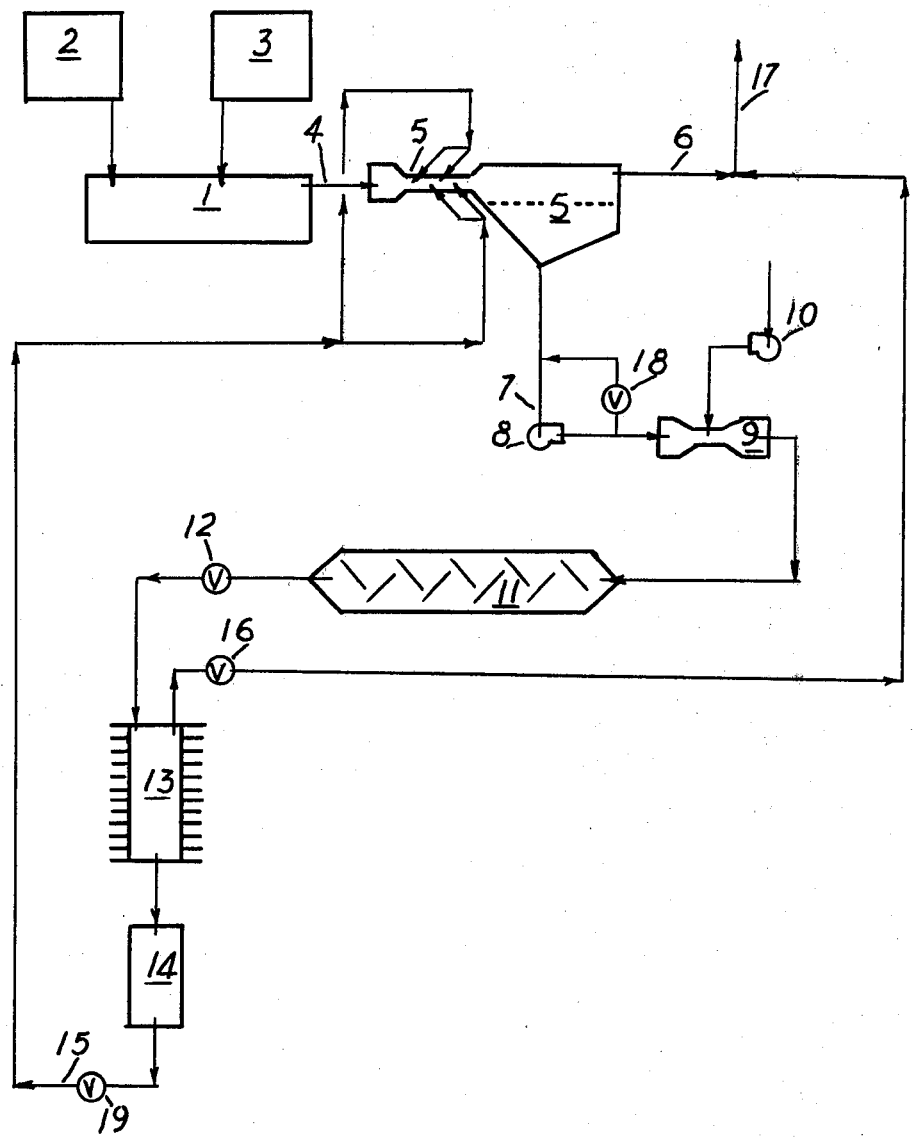

INTERNAL COMBUSTION ENGINE-EXHAUST GASES AND PARTICULATE TREATMENT

INTRODUCTION

Research on animals by the environmental protection agency has found indications that internal combustion engines, and particularly diesel exhaust, are a potential cancer producers.

The Federal Environmental Agency is concerned with the very fine particles of soot and carbon monoxide content of the exhaust gases from pipes of existing internal combustion, particularly diesel engines. The EPA is considering a limit on soot of 0.6 grams per mile for diesels in 1981 and only 0.2 grams per mile by 1983.

The "Brown Cloud" air pollution near metropolitan centers is produced by very small particles created by man's normal daily activities. These particles range from 0.20 micrometer to 2.0 micrometers in diameter. Carbon particulates are usually the predominant fine particulate species; such as carbon black produced by internal combustion engines.

The federal new vehicle standard as of August 1977, requires by 1981; that hydrocarbons be reduced to less than 0.41 grams per mile; carbon monoxide less than 3.4 grams per mile and oxides of nitrogen to less than 1.0 grams per mile.

A need exists to reduce the hydrocarbons, carbon, and carbon monoxide released by internal combustion engines to atmosphere.

HISTORICAL AND DESCRIPTION OF PRIOR ART

Wet oxidation using a water carrying medium and oxidizable matter suspended by F. J. Zimmerman in the early 1950's. The concept was based on his discovery that most substances capable of being burned, could also be rapidly oxidized in the presence of water when heated and pressurized sufficiently to retain water as a liquid; along with introduction of an oxidant, such as air.

The use of an inert, halogenated hydrocarbon liquid as the liquid medium, to replace water, and thus achieve higher operating temperatures with less pressure; as well as retain the "wet" halogenated liquid for recycle us is new art and science disclosed by Vaseen U.S. Pat. Nos. 4,140,608; 4,139,595; and 4,139,596.

No prior art or historical use of this invention exists.

Patent applications using the method of wet chemical reaction are pending with Ser. No's. 832,635; 855,244 and 896,802.

REFERENCES:

| U.S. Pat. Nos. | | | |
|---|---|---|---|
| 2,886,114 | McGauley | 8/54 | 75/115 |
| 2,721,795 | McGauley | 10/55 | 423/215 |
| 2,746,859 | McGauley | 5/56 | 75/115 |
| 3,803,297 | Guth | | |
| 3,963,611 | Dardenne-Ankring, Jr. | 11/56 | 423/544 |
| 2,962,363 | Moorman | 11/60 | 422/142 |
| 3,080,382 | Rousseau | 3/63 | 422/146 |
| 3,799,747 | Schmalfeld | 3/74 | 422/146 |
| 4,102,989 | Wheelock | 7/78 | 422/166 |
| 4,139,595 | Vaseen | 2/79 | |
| 4,139,596 | Vaseen | 2/79 | |
| 4,140,608 | Vaseen | 2/79 | |

SUMMARY:

Internal combustion engines, particularly diesel engines emit with the products of combustion, unburned hydrocarbons, carbon particulates, and carbon monoxide; all of which are air quality contaminants.

The FIGURE represents apparatus for carrying on the process.

The family of inert liquids which are derived when hydrocarbons are halogenated called fluorocarbons, are unique in their ability to remain inert as well as retain their physical chemical characteristics even when acting in the capacity of carrier liquid for other chemicals that react between themselves within the medium of the carrier liquid. Selection of a specific fluorocarbon liquid for high temperature operation and superatmospheric pressures; makes it possible to along with the absorptive characteristics of these fluorocarbon liquid for high temperature operation and superatmospheric pressures; to "wet" oxidize chemicals therein.

The fluorocarbon liquid selected is one which preferably has the following physical/chemical specifications:
1. Boiling point several times that of water
2. Specific gravity either less than or more than that of water
3. Practically non volatile at selected operating temperatures
4. Critical temperature—above established maximum operating temperatures
5. Non miscible with water
6. Nontoxic to bio-organisms
7. Stable physical/chemical characteristics at ambient as well as elevated temperatures (for instance 600° F. when with 40 atmospheres operating conditions).
8. Nonbiodegradable
9. Nonoxidizable—even with ozone
10. Have an affinity for absorbing gases
11. Reusable for repeated cycles of use
12. Nonflammable.

Of the many inert, dielectric, absorber liquids manufactured, which meet the above specifications the fully halogen saturated hydrocarbons, or mixtures, thereof, are preferred. For those versed in the art and science of inert (gases), absorber liquids, they will have no difficulty in selecting a specific liquid.

The process is performed in a composite of several apparatus, the first of which consists of an absober vessel (5) containing the absorber liquid in specific quantity to absorb the carbon monoxide and hydrocarbon compounds, now gaseous or nearly so due to temperature of the exhaust (4) gases; as well as wash out of by entrapment the exhaust gases stream the carbon particulates. Preferably the absorber apparatus (5) is of the counterflow principal; that is, the hot exhaust gases (4) first contacted with absorber liquid which is about to leave the absorber vessel for wet oxidation in the wet oxidation apparatus (11), the exhaust gases commingled with the absorber liquid throughout the vessel (5) with the contaminant gases stripped from the gases stream as they leave (6) the vessel for disposal to atmosphere ( 17).

The rate of flow of absorber liquid through the absorber vessel (5) and wet oxidizer apparatus (11) is controlled by a pump (8) which produces the superatmospheric pressure, for example 1 atmosphere to 1500 atmospheres, but preferably 40 atmospheres, in the wet oxidizer vessel (11). An auxiliary air supply is provided by a high pressure compressor (10) to assure excess oxygen as required for wet oxidation of the contaminant gases, vapors and particulates, in the wet oxidizer (11). An injector apparatus (9) is preferably used to commingle the air with its oxygen with the flow of hot absorber liquid to the wet oxidizer (11).

A combination flow and pressure relief valve (12) controls any over-pressure and over temperature of the wet reactor vessel (11). The rate of flow of the absorber liquid, the temperature and superatmospheric pressure are co-balanced with the rate of production of the exhaust gases to assure wet oxidation of the contaminant gases, vapors, and particulate carbon.

PREFERRED EMBODIMENT

The apparatus for eliminating contaminant gases, vapours and carbon from internal combustion engines exhausts, particularly diesel fuel engines consists of an absorber (5) vessel, preferably of a counterflow design with the flow of inert absorber liquid countercurrent to the engine exhaust gases through the vessel. A high pressure pump (8) with automatic by pass valve (18) to transfer a proportionate quantity related to RPM of engine of gases and particulate saturated absorber liquid from the absorber vessel to the wet oxidizer vessel (11). An auxiliary air injector (9) with its auxiliary air compressor (10) is inserted in the influent piping between the absorber vessel and the wet oxidizer vessel. Normal engine operation does not require the use of this auxiliary air which is only available for extraordinary pollution emissions from the engine, such as during extreme loadings and tune ups.

The wet oxidizer vessel is a high pressure vessel which along with the controlled hot temperature of the influent contaminants pregnant absorber liquid, in combination cause the oxidizable carbon particulates, carbon monoxide gas, and hydrocarbon vapours to instantly react with the excess oxygen gas carried absorbed along with the absorber liquid; thus, oxidizing these contaminate materials to carbon dioxide gas and water vapour.

DIELECTRIC LIQUID ABSORBANTS

The dielectric liquids must have certain physical chemical characteristics in general as follows:
1. Boiling points in excess of 316° C. (600° F.)
2. Low vapor pressures—non volatile
3. Specific heat capacities greater than 0.20
4. Superatmospheric critical pressures
5. Non-miscible with water
6. Non toxic to organic life
7. Stable chemical/physical properties
8. Reusable for inumerable cycles
9. Non-biodegradable
10. Non flammable—no flash point
11. Affinity for dissolving gases and vapours Of the many dielectric liquids which meet these general conditions, fluorocarbons, in particular, are recommended.

Fluorocarbons are easily made by the reaction of carbon with fluorine.

Removal of hydrogen atoms from the carbon skeleton, either singly or in pairs, is much more easily accomplished than the removal of fluorine atoms. This is a partial explanation of the failure of fluorocarbons to take part in organic chemical reactions. The almost perfect covering power of the fluorine atoms for the carbon skeleton protects the internal force fields and necessitates a much higher energy of activation to initiate reaction for the fluorocarbons than for hydrocarbons.

Henry's law constants are inversely proportional to solubility on a mol basis. Fluorocarbon liquid dielectrics have a greater solubility for gases components with increasing fluorine saturation. This is demonstrated by the following:

| HENRY'S LAW CONSTANTS, ATMOSPHERIC, AT 24° F. | | | | | |
|---|---|---|---|---|---|
| Solvent | Nitrogen | Oxygen | Argon | Krypton | Xenon |
| $CCl_2F_2$ | 420 | 400 | 410 | 230 | 76 |
| $CCl_3F$ | 760 | 530 | 500 | 210 | 62 |
| $C_2FlF_3$ | 340 | 450 | 510 | 360 | 130 |
| $C_2Cl_2F$ | 450 | 410 | 410 | 220 | 72 |
| $C_2Cl_3F_3$ | 650 | 480 | 460 | 200 | 62 |
| $CHClF_2$ | 500 | 410 | 400 | 200 | 65 |
| $CHCl_2F$ | 1100 | 690 | 640 | 230 | 65 |
| $CCl_2F_3$ | 420 | 400 | 410 | 230 | 76 |
| $C_2Cl_2F_4$ | 450 | 410 | 410 | 220 | 72 |
| $C_3Cl_2F_6$ | 460 | 400 | 400 | 210 | 68 |
| $C_4F_{10}$ | 260 | 230 | 230 | 140 | 51 |
| $c-C_4F_8$ | 300 | 250 | 240 | 140 | 47 |

Regular and related solutions, Hildebrand, Prausnitz and Scott; advise (converted from grams per liter to pounds per 1000 pounds); as follows: (1-atmosphere)

| Solvent | Carbon Dioxide Pounds Per 1000 Pounds Solvent | Nitrogen | Oxygen |
|---|---|---|---|
| $(C_4F_9)_3N$ | 1.46 | 0.134 | 0.072 |
| $C_8F_{16}O$ | 1.95 | 0.181 | 0.093 |

All liquid fluorocarbons, with eight (8) or more carbon atoms, can be the absorber liquid. Certain liquid fluorocarbons are more usable than others depending on the particular separation and process operation which takes into account—absorbent capacities, boiling points, critical points, viscosity, and other physical/chemical characteristics of the absorbent.

Fluorocarbon scrubber or contact liquid used in this process can be one of many such as the group consisting of alkane and cycloalkane derivatives which have at least one fluorine atom; perfluoroamines, including hetrocyclic compounds; and perfluoroethers; including heterocyclic compounds. Examples, but not limited thereto are the alkane and cycloalkane derivitives—straight chained compounds as $CBrF_3$, $CCl_2F_2$, $CHClF_2$, $C_2Cl_2F_4$, and $C_3Cl_2F_6$. Branched compounds such as $C_5F_{12}$ and cyclic compounds such as $c-C_4F_8$. A perfluoramine for example could be $(C_4F_9)3_N$ and a perfluorether could be $C_3F_7CF_2OCF_2C_3F_7$. An example of a heterocyclic ether absorbent is:

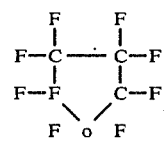

Perfluoro alcohols, ketones, acids and esters of fluorocarbons can be used, but usually less suitable when all properties are considered.

All hydrocarbons can be considered derivatives of methane with hydrocarbon radicals replacing hydrogen atoms. The lack of a measurable dipole moment with hydrocarbons, means that the electric symmetry is not disturbed by replacement of a hydrogen atom with a hydrocarbon radical.

The replacement of the hydrogen atom by a halogen atom as a fluorocarbon radical does, however, introduce a dipole moment. In the fluorocarbon the replacement of a fluorine atom with a fluorocarbon radical does not change the electric symmetry as indicated by the failure to direct a dipole moment. The replacement of a fluorine atom with a hydrogen atom or hydrocarbon radical does, however, introduce a dipole mement.

It is apparent, therefore, that all hydrocarbons can be considered derivatives of methane; but all fluorocarbons are derivatives of methforane. ($CF_2$)

Fluorocarbon oxides are not derivatives of water. They are not ethers. They are properly derivatives of $OF_2$.

Amines are derivatives of ammonia in which one or more of the hydrogen atoms are replaced with organic radicals. Although called amines, there are actually no such structures as fluorocarbon amines, because a fluorocarbon radical attached to a nitrogen atom is a replacement for a fluorine not a hydrogen atom.

The fluorocarbon nitrides, are derivatives of nitrogen trifluoride, not of ammonia.

Derivatives of fluorocarbons are made with fluorocarbon groups attached to almost all other elements other than carbon or fluorine. If the attachment is made to a more electronegative element such as chlorine, oxygen, or nitrogen, a structure results that has a thermal stability and chemical inertness very similar or equal to the fluorocarbon themselves. Fluorocarbons with low electronegative elements attached tend to become less thermally stable and more reactive chemically.

Perfluorocarbons are compounds of carbon and hydrogen in which all the hydrogen atoms attached to the carbon have been replaced by fluorine.

Cyclic fluoroalkylene oxide fluorocarbon compounds, are the cyclic carbon compound which contain only oxygen in addition to the fluorine and carbon. These compounds have a high deree of chemical inertness; they do not burn or react with oxygen, they are colorless; and water insoluble, as well as have an affinity to dissolve gases. Generally these compound with 6 or more carbon atoms are liquid. The larger the number of carbon atoms in the compound generally the higher the boiling point. The general formula for these compounds is $$CF_2(CF_2)_nO$$

where "n" is an integer having a value of two, three or four.

Compound cyclic fluoroalkylene oxide fluorocarbons are compounds in which one or more of the above are combined to form a single compound.

These compounds constitute the family of fully fluoridated analogues of the family of saturated hydrocarbon alkylene oxides, the carbon-oxygen fluorine skeletal structure being the same but all hydrogen atoms being replaced by fluorine atoms. Additionally this family of compounds embraces cyclic as well as non-cyclic compounds, and poly as well as mono oxides, all of which have their structural alalogues in the hydrocarbon system of oxides.

Unsymmetrical as well as symmetrical compounds are included. The lack of symmetry may arise from different numbers of carbon atoms in the fluorocarbon group, another type of non symmetry exist when the groups differ as to branching, as when one group is branched and the other are normal straight chains or rings.

All the fluorocarbon tertiary amines contain only carbon, fluorine and nitrogen atoms and each nitrogen atom is directly bonded to three carbon atoms.

These compounds constitute the family of fully fluoridated analogues of the family of saturated hydrocarbon tertiary amines, the carbon-nitrogen skeletal structures being the same but all hydrogen atoms being replaced by fluorine atoms. Additionally, this family of compound embraces cyclic as well as non-cyclic compounds, and polyamines as well as nomoamines, all of which have their structural analogues in the hydrocarbon system of tertiary amines.

These compounds which contain five or more carbon atoms in the molecule have boiling points about room temperature and hence are liquid. Compounds containing eight or more carbon atoms in the molecule have boiling points near to or above that of water. The following table illustrates the rise in boiling points with increased carbon atoms.

| COMPOUND | B. P. (°C.) |
|---|---|
| $(CF_3)_3N$ | −11 |
| $(C_2F_5)_3N$ | 70 |
| $(C_2F_7)_3N$ | 130 |
| $(C_4F_9)_3N$ | 178 |
| $(C_5F_{11})_3N$ | 218 |
| $(C_6F_{13})_3N$ | 238 |
| $(C_7F_{15})_3N$ | 294 |
| $(C_8F_{17})_3N$ | 321 |
| $(C_{8+x}F_{17+})_3N$ | 321 |

None of the trifluorocarbon amines are water or mineral acid soluble or react chemically with the mineral acids. They all have an affinity for dissolving gases.

This family of tertiary amines includes unsymmetrical as well as symmetrical compounds. The lack of symmetry arises from different numbers of carbon atoms in the various fluorocarbon groups. Another type of non-symmetry exists when the groups differ as to branching, as when one group is branched and the others are normal straight chains or rings.

Fluorocarbons are made which not only include both nitrogen (amines) and oxygen (oxides); but replace one or more of the fluorine atoms with bromine, chlorine, iodines; and one or more of the nitrogen or oxygen atoms with sulphur, phosphorous, mercury, as well as retain some hydrogen atoms.

Those familiar with halogenated hydrocarbons liquids, will have no difficulty in selecting a specific absorber liquid for the combined purpose of absorbing carbon monoxide gas, hydrocarbon vapours and entrapping particulate carbon.

A combination pressure temperature control valve (12) retains the absorber liquid in the wet oxidation reaction vessel at a preselected pressure and maximum temperature combination. Excess pressure or elevated temperature or both cause the valve to open sufficiently to control both.

The wet oxidation reactions of the oxidizable materials are exothermic therefore, along with the temperature due to absorption of heat from the exhaust gases; the absorber liquid and released gases are cooled in a heat exchanger cooler (13). The absorber liquid as released through a valve (12) from high pressure to slightly above atmospheric for example 1 atmosphere to 39 atmospheres, but preperably 5 atmospheres, at the heat exchanger cooler (13) releases its absorbed gases and vapours which now consist of carbon dioxide and water which are released through a valve (16) to the exhaust system at atmospheric pressure. The slight pressure for example 5 atmospheres retained on the absorber liquid in the heat exchanger cooler (13) drives the absorber liquid to an absorber liquid reservoir (14) (which can be a part of cooler), and also through the absorber vessel (5) for repeat cycle use.

Clean, scrubbed exhaust gases which escape the absorber vessel (6) absorption into the inert liquid are commingled (17) with the wet oxidizer effluent gases and disposed of to atmosphere.

The art and science of the design of the apparatus is best tought by example.

For example an internal combustion engine having an effluent exhaust gas producing in excess of air pollution air quality standards; one (1) gram of soot (carbon particulates); twenty (20) grams of carbon monoxide; and three (3) grams of hydrocarbons; per mile when averaging 20 miles per gallon of fuel with a sustained speed of 55 miles per hour; is provided a wet oxidation after burner apparatus as hereafter described.

The exhaust gases from the engine are found for example to contain: one (1) gram of carbon particulates (ranging from 0.2 to 2.0 micrometer in diameter); twenty (20) grams of carbon monoxide; three (3) grams of volatile hydrocarbons; one thousand and four (1004) grams of carbon dioxide; three hundred and ninty-six (396) grams of excess oxygen; seven hundred and seventy (770) grams of water vapour; and seven thousand, four hundred (7400) grams of nitrogen. The gases range from 400° F. (204.4° C.) to 800° F. (426.7° C.) with an average for example of 600° F. (315.6° C.); as they enter the absorber vessel.

The absorber vessel replaces the usual internal combination engine muffler; as if both muffles the hot exhaust gases noise, and also absorbs the carbon particulates, carbon dioxide gas and hydrocarbons vapours. The absorber is preferably of the high energy type, such as a venturi configuration through which the hot exhaust gases are commingled with the inert absorber liquid, which is sprayed through nozzles, across and against the direction of flow of the hot exhaust gases in the throat of the venturi configuration. Those versed in the art and science of absorption of gases in absorber liquids will have no difficulty designing a specific system to receive, for example 760 cubic feet per mile of 400° F. (204.4° C.) to 800° F. (426.7° C.), but preferably 600° F. (204.4° C.) to 800° F. (426.7° C.), but preferably 600° F. (315.6° C.) hot internal engine exhaust gases; and commingling them with for example at 10 MPH, 1.67 GPM of the inert absorber liquid; ranging up to 60 MPH and 10 GPM of absorber liquid. The rate of flow (8) of the inert absorber liquid through the absorber vessel is controlled by a coordination of MPH (miles per hour) or engine RPM with the opening and closing of the absorber liquid pump (8) by pass valve (18); pump RPM; or combination of both.

Normal operation of an internal combustion engine, including those on diesel fuels, contain excess oxygen than that required for "complete" combustion; therefore additional oxygen supply is not required; but under conditions of burning raw petroleum, and or unrefined vegetable oils; along with many combustible fuels; particularly, particulate carbon will be scrubbed from the raw exhaust gases in the absorber vessel (5) so that under extraordinary conditions additional oxygen added to the wet reactor vessel (11) is advantageous. Under these conditions, or during engine "tune up" periods, or any other extenuating circumstances which cause undue amounts of oxidizables to remain in the exhaust gases from the engine; and auxiliary air supply (10) is preferably provided.

The absorber (5) vessel when consisting of a venturi type mixer/scrubber, is provided with a throat diameter which provides preferably no greater loss of pressure head, or resistance to the flow of hot gases through it, than the usual internal combustion engine muffler. This is particularly true when the apparatus is being used to adapt an existing engine, now using a muffler exhaust system. For example heretofore, used to illustrate, a one (1) inch throat is preferable.

The wet oxidizer vessel is for this example a longitudinal vessel designed for wet reacting the carbon particulates of from 0.20 micrometers to 2.00 micrometers, in diameter, the absorbed carbon monoxide gas, and the absorbed hydrocarbon vapours; when the reactor is operating in the temperature range of from 212° F. (100° C.) to 800° F. (426.67° C.) and ranging from (5) five atmospheres to (100) one hundred atmospheres, but preferably 588° F. (308.89° C.) and fourty (40) atmospheres.

Reaction time at the preferred conditions is, depending on particulate size, and other miscellaneous factors, calculated to be (1/10) on tenth second. The reactor is preferably designed for the maximum rate of flow of the inert absorber liquid; for this example the rate of ten (10) gallon per minute.

A wet reactor vessel having a length ranging from one (1) time the diameter or widest dimention of the cross section to one hundred (100) times the diameter or widest dimention of the cross section, but preferably five (5) times the length to diameter or widest dimention of crossection, is selected. The interior is baffled in a manner as to cause continuous turbulence throughout the reactor length. For example, a square reactor vessel 4.80 inches on the side and 24.00 inches long retains the maximum rate of flow of ten (10) GPM for (30) thirty seconds at 588° F. (308.89° C.) at (40) fourty atmospheres; carrying into the eactor 3464 BTU per mile of heat transferred to the absorber liquid which entered the absorber vessel at 212° F. (100° C.); and leaves the absorber vessel at 576° F. (302.22° C.).

The wet reactor when stoickiometrically oxidizing the particulate carbon, absorbed carbon monoxide, and absorbed hydrocarbon vapours, leaves the wet oxidizer; when operating the engine at the maximum conditions heretofore; at 588° F. (308.89° C.) with 3819 BTU per mile.

The pressure/temperature control valve (12) which retains the operating pressure at a predetermined point, for example (40) fourty atmospheres; and a predetermined temperature, for example 588° F. (308.89° C.), releases the (processed) wet oxidized contaminates absorber liquid to a lower, superatmospheric pressure. For example 1 atmosphere to 39 atmospheres, but preferably 5 atmospheres. The relief of pressure on the spent absorber liquid, now pregnant with carbon dioxide and water vapour, along with its original content of carbon dioxide and nitrogen, is relieved of most of these gases by effervescense from the liquid at lower pressure. These gases are releaved in the heat exchanger cooler.

Those versed in the art and science of pressure vessels will have no difficulty designing the configuration and capacity of wet oxidizer to other conditions than those of this example.

The heat exchanger/cooler is a reservoir vessel which can be engine radiator water cooled, or air flow through fins cooled. For those versed in the art and science of heat exchangers, they will have no difficulty in selecting a proper type and design to dissipate to atmosphere or for transfer to useful work, the heat accumulated per each cycle; for this example 3819 BTU per mile when the engine is operating at maximum conditions heretofore.

The retained pressure of the absorber liquid is releaved by discharge of the balance of the gases and vapours by means of a pressure relief valve (16) to atmosphere. The liquid is drained to a cooled liquid reservoir (14) and is moved to the absorber liquid jets on the absorber vessel by the retained speratmospheric pressure, for example 5 atmospheres. Thus the cooled absorber liquid is recycled again and again adinfinitum.

With the stopping of the engine all pumps, valves, and vessels come to rest, with pressures returned to atmospheric, except for the wet oxidizer.

Those versed in the arts and sciences herein required will have no difficulty in selecting both kind and type of materials, structural as well as process; as well as mechanical configurations which will conform to an accumulation of several separatus to a combined apparatus; thus achieving the object of the invention. The object being to remove from the exhaust gases of internal combustion engines, those contaminants of air quality, which are oxidizable; particularly carbon particulates, carbon monoxide gas, and hydrocarbons vapours.

While the invention has been described with a certain degree of particularity; it is understood that the disclosure has been made by way of an example; and that changes in configurations of specific parts of the apparatus; changes in pressures of operation, changes in temperatures of operation, and methods of controls may be made witout departing from the spirit thereof.

DESCRIPTION OF DRAWINGS

1—Internal Combustion Engine.
2—Hydrocarbon Fuel.
3—Combustion Air.
4—Engine Products of Combustion.
5—Absorber Vessel.
6—Clean Exhaust Gases—Freed of Hydrocarbons, Carbon Monoxide and Particulate carbon.
7—Inert Hot Absorber Liquid, Pregnant with Hydrocarbons, Carbon Monoxide and Carbon Particulates.
8—Pressure Pump to Pressurize Wet Oxidizer.
9—Injector for Supplemental Air, if Required.
10—Air Compressor for Supplemental Air.
11—Wet Oxidizer Vessel.
12—Pressure Regulator Valve.
13—Cooler Heat Exchanger to Cool Inert Absorber Liquid.
14—Absorber Liquid Reservoir.
15—Influent Absorber Liquid to Absorber Vessel
16—Pressure Reducing Valve to Release Carbon Dioxide and Water Vapour to Exhaust System.
17—Combination Exhaust System for Hot Gases to Atmosphere.
18—Automatic By Pass Valve.
19—Pressure Regulator Valve.

What I claimed is:

1. A process for treating exhaust gases from an internal combustion engine which comprises:
    absorbing the exhaust gases and trapping carbon particulates in an inert halogenated hydrocarbon liquid containing eight or more carbon atoms, the major halogen being fluorine,
    transferring said liquid containing impurities to an oxidizer vessel and wet oxidizing the impurities at a temperature of 212° F. to 800° F. and a pressure of 5 to 100 atmospheres,
    reducing the pressure on the liquor and venting the oxidized impurities to the atmosphere,
    cooling the liquid from the oxidizer vessel and returning it to the absorber.

* * * * *